INVENTORS
EDWARD P. HARRIS
FREDERICK W. SAMPSON
JAMES R. WALL
BY
their ATTORNEY

United States Patent Office 2,858,095
Patented Oct. 28, 1958

2,858,095

VALVING DEVICE

Edward P. Harris, Frederick W. Sampson, and James R. Wall, Dayton, Ohio, assignors to General Motors Corporation, Detroit, Mich., a corporation of Delaware Application August 26, 1955, Serial No. 530,832

2 Claims. (Cl. 251—9)

This invention relates to valves and is particularly concerned with throttle valves for controlling the flow of fluid through conduits.

An object of the invention is to provide a valve which comprises two relatively reciprocally movable members that surround an elastomeric tube, one of said members carrying a clamping or pinching device that is variably engageable with the tube in response to the relative position of said members with respect to one another whereby the flow of fluid through the tube may be varied as desired.

A further object of the invention is to provide a valve for controlling the flow of fluid in an elastomeric tube wherein a pair of telescopically engaged members are provided that are reciprocally movable with respect to one another between fixed limits. A clamping device normally effective to throttle the flow of fluid in the elastomeric tube which passes coaxially through said members is attached to one of said members while camming means are carried by the other of said members which are effective upon relative movement of said members to modify the clamping effect of said clamping means upon said tube whereby the flow of fluid through said tube is controlled by the relative position of said members with respect to one another.

Further objects and advantages of the present invention will be apparent from the following description, reference being had to the accompanying drawings, wherein preferred embodiments of the invention are clearly shown.

When supplying fluid materials, for example, latex foam, to molds and the like it is desirable to throttle the flow of said fluid in the conduit leading from the supply means to the mold so that the flow of said latex foam or other fluid may be controlled or may be stopped entirely. The present invention is directed to a valving device for accomplishing this purpose which is relatively simple in structure and which may be rendered effective to permit flow of fluid therethrough when the valving device is engaged with a mold or other means.

Figure 1:
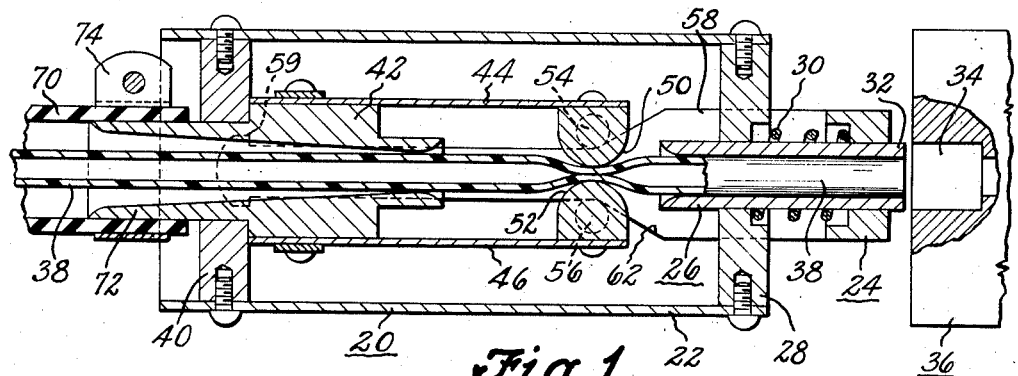
Figure 1 is a cross sectional view of the valving device shown in closed position with respect to a portion of a mold.
Figure 2:
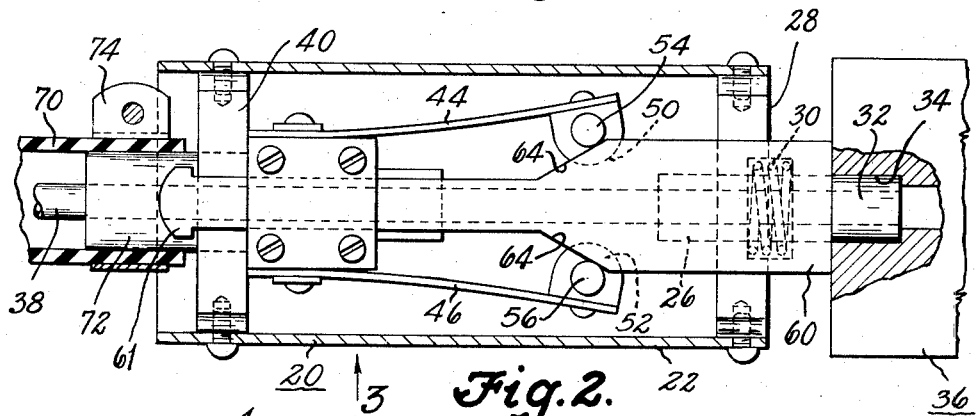
Figure 2 is a view partially in section similar to the view shown in Figure 1 wherein the valve has been engaged with the mold and is in full flow position.
Figure 3:
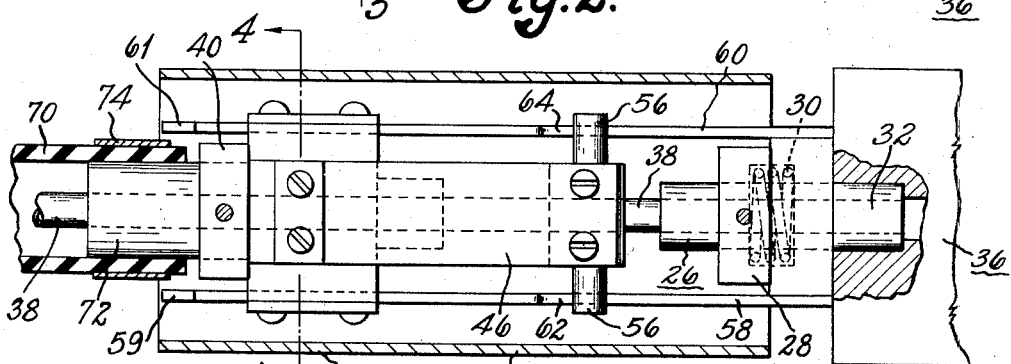
Figure 3 is a view partly in section of the valve shown in Figures 1 and 2 taken in the direction of the arrow marked 3 in Figure 2.
Figure 4:
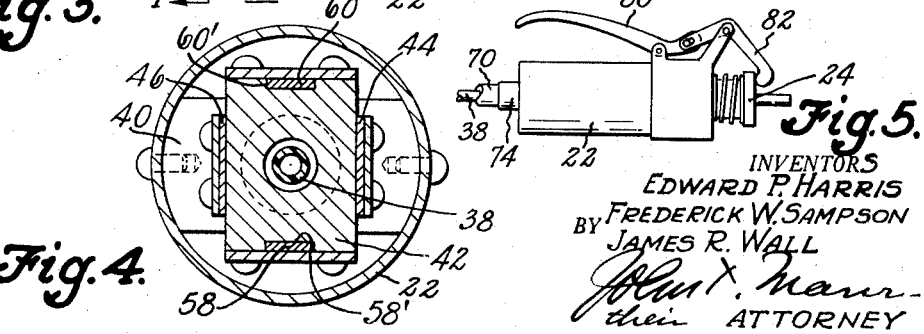
Figure 4 is a sectional view taken on line 4—4 of Figure 3.

Referring specifically to the drawings a valving device is shown at 20 in Figure 1 which includes a tubular body member 22 and a reciprocally movable outlet member or fixture 24 coaxially arranged with the body member 22.

The fixture 24 is reciprocally movable with respect to the member 22 and is slidably mounted on a tubular member 26 which passes through an end wall 28 of the member 22 and is fixed thereto. Interposed between the end of the fixture 24 and the member 28 is a spring 30 which normally urges the fixture 24 outwardly and away from the body member 22. The fixture 24 is apertured so that a tubular end portion 32 of member 26 passes therethrough and is adapted to fit into a recess 34 in a device, for example, a mold 36. The tubular member 26 has inserted therein and fixed thereto an elastomeric tube 38 which extends through the member 22. At the other end of the member 22, a support 40 is provided which supports a member 42 that in turn loosely surrounds the elastomeric tube 38. The support 40 is fixed to the tubular member 22. Mounted on the member 42 are two spring-like tynes 44 and 46 which extend outwardly therefrom and carry at their extreme outward ends abutments 50 and 52 respectively. The abutments 50 and 52 are journaled on rods 54 and 56 respectively which extend outwardly from the bifurcated ends of the spring-like tynes 44 and 46. The fixture 24 at its inner end comprises two strips or bars 58 and 60 which include sloping portions or camming surfaces as at 62 and 64 which engage the ends of the rods 54 and 56. Thus, the rods ride upwardly on the inclined surfaces 62 and 64 in one position of the device to cause the spring-like members 44 and 46 to be urged outwardly whereby the abutments 50 and 52 are removed from their pinching action on the tube 38 as shown in Figure 1. This position of the camming surfaces 62 and 64 is occasioned by pressing the fixture 24 against the mold 36 while it is held by the outer tubular member 22. This permits the rods 54 and 56 to move up the inclined surfaces 62 and 64.

As the pressure is relieved to disengage the valve from the mold 36 the spring pressure of spring 30 together with springs 44 and 46 causes the rods 54 and 56 to move downwardly on the inclined surfaces 62 and 64 whereby the abutments 50 and 52 again engage the tube 38 to pinch the same and throttle down the flow of fluid therethrough. It is apparent that by properly dimensioning the inclined surfaces 62 and 64, abutments 50 and 52 and tube 38 that the action of the valve may be one of throttling or complete shut off. At the left end of the device as shown in the drawings, a second tubular member 70 is provided which fits over a cylindrical portion 72 carried by the member 42. The tube 70 is clamped by means of a clamp 74 to the member 72 and acts as a protection for the elastomeric tube 38 which passes therethrough. It will also be noted that the strips or bars 58 and 60 slide through slots 58' and 60' in the member 42 and the outward movement therein may be limited by stops 59 and 61 comprising enlarged portions at one end of the bars 58 and 60 respectively.

Thus, the valve as shown in the drawings may be used in a number of applications and is specifically designed to be used in connection with mold filling wherein a flowable material passes through the tube 38. In this instance it is merely necessary to engage the tubular portion 32 and the fixture 24 with the mold entrance 34 and press the tubular portion 22 toward the mold whereupon the valve is opened and the material is permitted to flow therethrough. When the mold is full, pressure on the cylindrical portion 22 is removed whereupon the valve closes and may be used to fill a subsequent mold. In practice, the cylindrical portion 22 may be held in a fixture which reciprocates the valve toward and away from molds which pass thereby on a turntable whereby as a mold is properly positioned and the turntable is stopped the valve is engaged with the mold and opened by reciprocal movement of the mechanism which is operated in timed relation to the position and action of the turntable.

Figure 5:
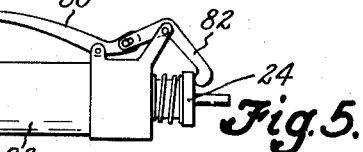
Figure 5 is a modification of the valve wherein an operating lever is used to actuate the valve.

Figure 5 shows a modification of the valve structure wherein an operating lever 80 is mounted on the cylindrical body portion 22 and includes an end portion 82 which engages the end fixture 24 whereby the valve may be actuated by pressure applied to the lever 80.

The present valve, due to the constant diameter passage therethrough, is easy to clean and maintain, since it does not include crevices, cavities or corners in which flowable material may be trapped. For this reason it is particularly suited for use with viscous or sticky liquids or materials such as latex foam which tend to set up or gel at the entrapped portions.

While the forms of embodiment of the invention as herein disclosed constitute preferred forms, it is to be understood that other forms might be adopted, as may come within the scope of the claims which follow.

What is claimed is as follows:

1. A valve for controlling flow of a fluid, comprising, an elastomeric tubular member, an annular outlet fixture disposed about one end of the tubular member, a body means carrying said tubular member and attached to said tubular member, a reciprocally movable member telescopically positionable within a predetermined range relative to said tubular member and said outlet fixture and having an actuating end portion in proximity to a tubular end portion of said outlet fixture, both portions being located outside of said body means, spring means provided between said body means and said movable member biasing said movable member in one direction relative to said body means for positioning said actuating end portion adjacent to said tubular end portion of said outlet fixture, said movable member being shiftable against said spring means and away from the tubular end portion of said outlet fixture, a pair of leaf springs each mounted at one end relative to said body means and each extending longitudinally of said tubular member, opposed abutment portions carried by said leaf springs and adapted to engage and pinch said tubular member on opposite sides in varying degrees for controlling passage of fluid relative to said outlet fixture, and a camming surface provided by said movable member in a location within said body means and adapted to be shiftable relative to said abutment portions to regulate positioning thereof relative to said tubular member as said abutment portions move against bias of said leaf springs and as said movable member is moved against bias of said spring means.

2. The valve of claim 1 wherein said body means provides stop portions engageable by said movable member and adapted to limit range of movement thereof.

References Cited in the file of this patent

UNITED STATES PATENTS

| 902,942 | Craig | Nov. 3, 1908 |

FOREIGN PATENTS

| 2,864 | Great Britain | 1887 |
| 301,087 | Italy | 1932 |